United States Patent [19]

Wing

[11] Patent Number: 4,790,703
[45] Date of Patent: Dec. 13, 1988

[54] PREVAILING TORQUE FASTENER ASSEMBLY

[76] Inventor: George S. Wing, 531 Esplanade, Apartment 515, Redondo Beach, Calif. 90277

[21] Appl. No.: 42,358

[22] Filed: Apr. 24, 1987

[51] Int. Cl.[4] ............................................. F16B 39/16
[52] U.S. Cl. ................................. 411/260; 411/282; 411/301; 411/313; 411/324; 411/416; 411/937.2; 411/533
[58] Field of Search ............... 411/237, 259, 260, 301, 411/311, 313, 314, 324, 281, 282, 2, 3, 432, 416, 168, 937.2, 533

[56] References Cited

U.S. PATENT DOCUMENTS

| | | | |
|---|---|---|---|
| 2,349,513 | 5/1944 | Mortus | 411/277 X |
| 2,518,469 | 8/1950 | Harding | 411/237 |
| 2,940,495 | 6/1960 | Wing | 411/305 |
| 3,249,142 | 5/1966 | Phipard, Jr. | 411/311 |
| 3,434,168 | 3/1969 | Bonacci | 411/416 |
| 3,454,070 | 7/1969 | Phipard, Jr. | 411/168 |
| 3,918,345 | 11/1975 | Phipard, Jr. | 411/416 |
| 4,260,005 | 4/1981 | Stencel | 411/3 |
| 4,381,163 | 4/1983 | Witte et al. | 411/311 |

FOREIGN PATENT DOCUMENTS

| | | | |
|---|---|---|---|
| 293136 | 9/1953 | Fed. Rep. of Germany | 411/417 |
| 828003 | 2/1960 | United Kingdom | 411/260 |

*Primary Examiner*—Neill R. Wilson
*Assistant Examiner*—Curtis B. Brueske
*Attorney, Agent, or Firm*—Christie, Parker & Hale

[57] ABSTRACT

A tri-lobular section of a bolt receives a mating tri-lobular bore of a washer to prevent the washer from rotating. Roll formed male threads on the tri-lobular section of the bolt receive a cooperating nut. The nut has a base shaped for wrench engagement, a thin walled barrel, a spring temper, and a threaded bore. The thread of the nut has two thread diameters: a large diameter thread in the base and a smaller diameter thread in the barrel continuing from the base thread; both thread sections have the same pitch. The barrel thread is substantially circular when relaxed. The barrel elastically flexes in response to the lobes of the nut as the lobes turn in the barrel, and when rotation stops, the barrel generally conforms to the tri-lobular shape of the bolt to form a thread lock, but the base does not.

22 Claims, 6 Drawing Sheets

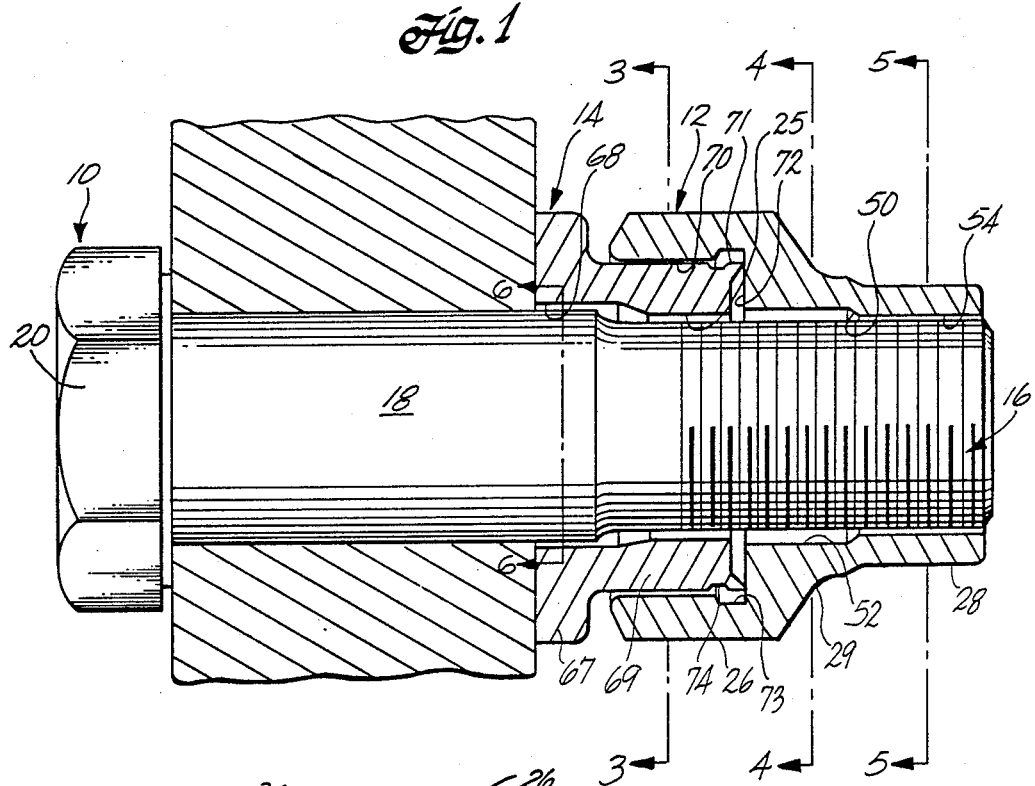
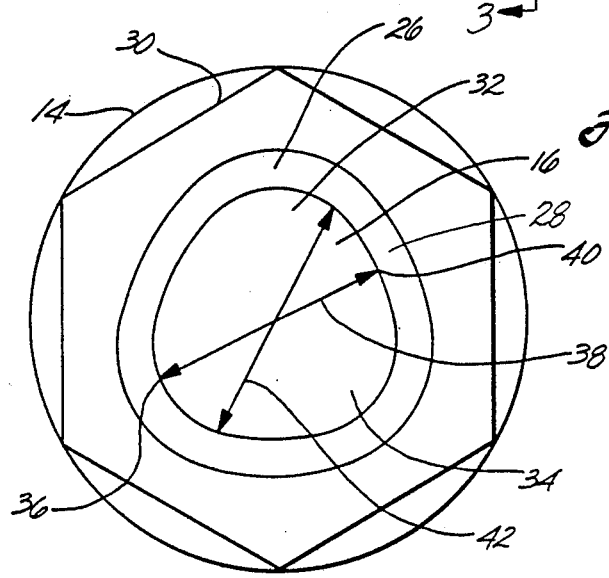

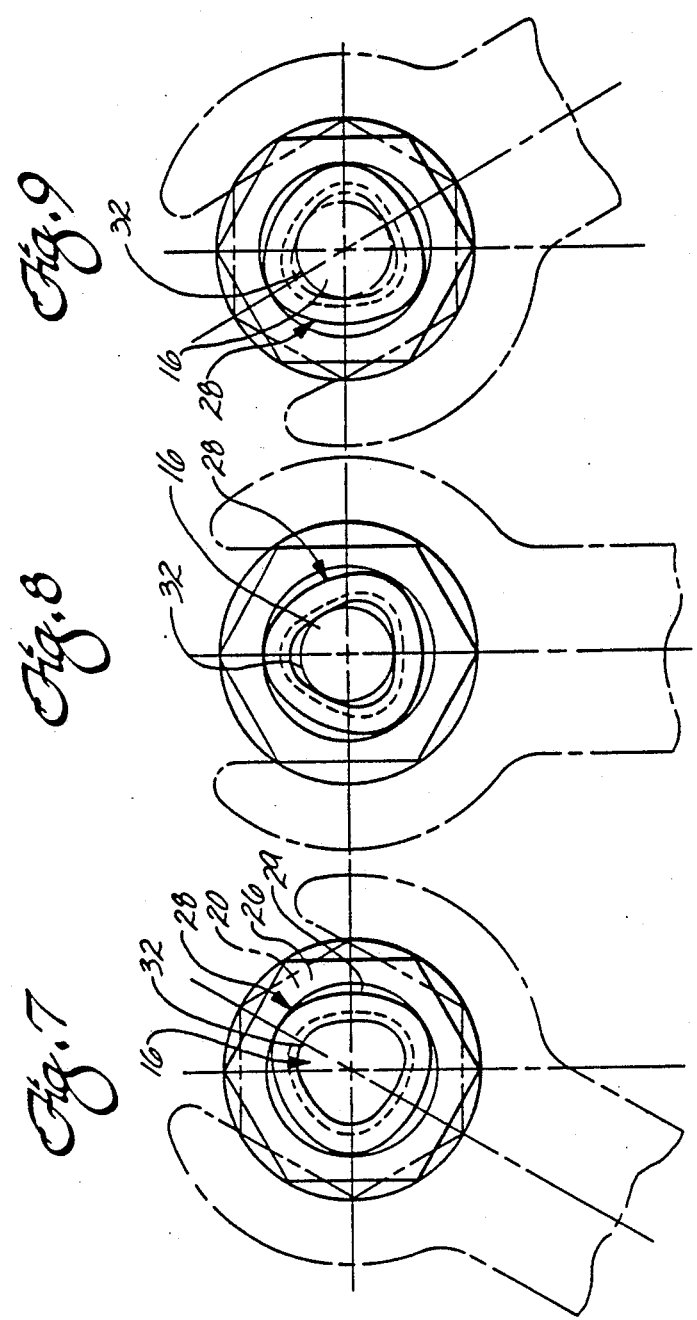

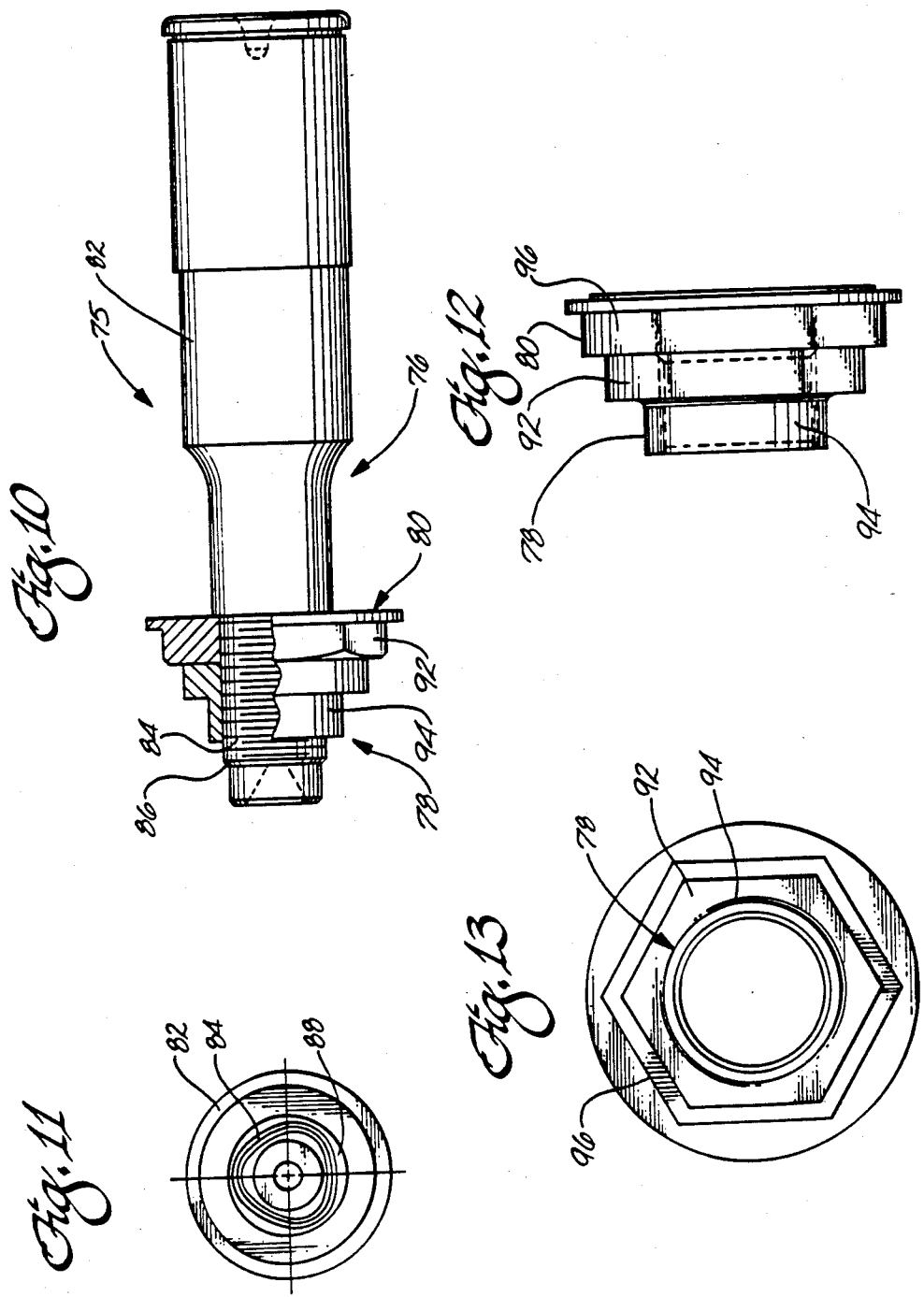

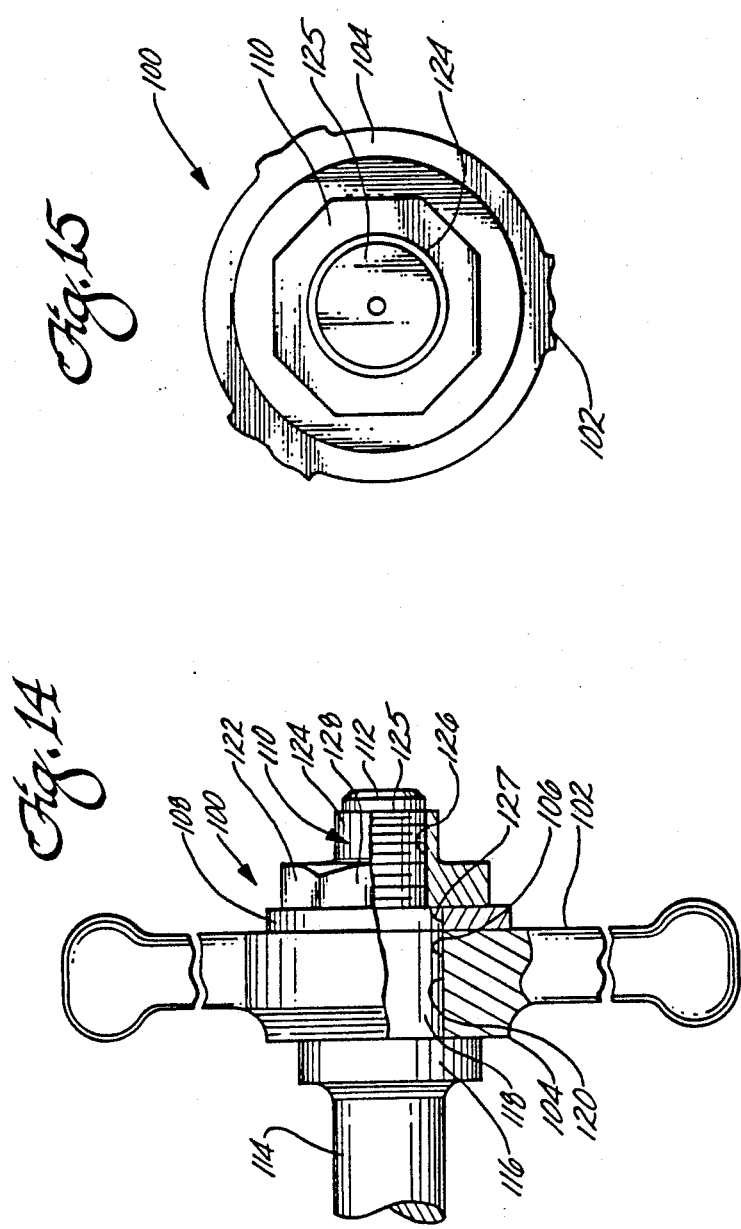

PREVAILING TORQUE FASTENER ASSEMBLY

BACKGROUND OF THE INVENTION

The present invention relates to fasteners in general, and, more in particular, to fasteners with a prevailing torque lock.

A prevailing torque lock on a threaded fastener prevents unwanted rotation of a female threaded element with respect to a male threaded element. (These two elements are called many things, for example: nuts, collars, pins and screws, but they will most often be called "nuts" and "bolts" in this specification.) A number of prevailing torque thread locks are known. Some employ a plastic insert in the thread of the nut to increase the friction between the nut thread and the thread of a bolt. Others rely on deformed nut threads, produced, for example, by crimping the threads.

When a nut must apply a closely controlled load, a prevailing torque thread lock is an excellent way of accommodating close load tolerance and maintaining the load in service.

When either the nut or the bolt bears on a rotating work face, prevailing torque thread locks have not generally been used because the provision for a barrier washer used to isolate the rotation can adversely affect the thread lock performance. An automobile spindle asembly is an example where prevailing torque thread locks have not been used.

In a typical automobile spindle assembly, an axle of the spindle, through wheel bearing sets, mounts a wheel for rotation. An adjusting nut on a threaded shank of the spindle holds the bearing sets and wheel on the axle. The adjusting nut loads the bearing sets a predetermined amount correlated to the torque applied to the nut during its installation. For optimum bearing life, the amount of bearing load must be held to within tight limits. Typically, the installer tightens the nut down to a desired tightness, say, 25 foot pounds of torque. The installer then backs the nut off about half a turn and then tightens the adjusting nut to some desired valve, say, about 15 inch pounds torque, and then installs a retainer, if necessary, and a cotter pin safety.

In such an arrangement, a transverse hole in the spindle receives the cotter pin that locks the nut against rotation by passing through castellation slots of the nut or of a nut retainer used with the nut.

The accuracy of loading on the wheel bearings with this technique depends entirely on registration of castellation slots of the adjusting nut or retainer with the cotter pin hole in the spindle. The variation in bearing loading dictated by this registration requirement often reduces bearing performance.

Since the wheel rotates on the spindle, its rotation can apply an unloosening or tightening torque, depending on the direction of rotation, to the adjusting nut. To prevent this, a barrier washer keyed to the spindle so that the washer does not rotate isolates the nut from wheel rotation. Keying may be done by a keyway in the spindle and a key tab of the washer received in the keyway. Keying of the washer may also be done by one or more flats on the spindle that cooperate with mating flats of the washer to keep the latter from rotating.

The requirement for the keyway slot in the spindle rules out many prevailing torque type thread locks and forces the use of the castellated nut method of locking the nut to the spindle, even with its many disadvantages. This is so because the edges of the keyway can abraid and ruin the plastic in plastic insert type prevailing torque lock nuts; and, at least in single crimp style prevailing lock nuts, the crimp can register with the slot permitting some rotation of the nut with a concomitant unacceptable loosening or tightening of the wheel.

With a spindle having flats instead of a keyway to keep the washer from rotating, the same problems occur with prevailing torque thread locks: The edges of the flats abraid the plastic of plastic-type prevailing torque lock nuts; and the flats can register with crimps of the nuts on that type of prevailing torque thread lock and permit some loosening or tightenting of the wheel.

Another disadvantage of castellated nut safetying, in addition to less than optimum bearing loading, is that the reliability of the safety depends on proper installation of the cotter pin. Proper installation requires rather careful hand bending of the prongs of the cotter pin; one prong must be bent over the bolt end and not extend beyond the bolt diameter, requiring cutting the prong if necessary; the second prong must be bent down against a wrenching flat of the nut and cannot rest against the barrier washer surface, again sometimes requiring cutting of the prong. If an optional prong wrap around method is used, the prongs cannot extend outward from the wrenching surfaces of the nut. With either method, all prongs must be bent leaving a reasonable radius at the bends in order to avoid prong breakage. Correct cottering becomes very demanding in inaccessible locations and in cold environments.

Self-tapping male threaded fasteners of arcuate triangular cross-sectional or tri-lobular shapes are well know. H. F. Phipard, Jr., describes a special form of such fasteners in U.S. Pat. Nos. 3,249,142 and 3,918,345, among other patents. The fasteners described in the Phipard patents have three, 120° spaced apart lobes or tips of major diameter and intermediate sides of minor diameter; the diameter measured across the shape anywhere around 360° is the same regardless of where taken because the rise to each of the lobe tips and the fall to each side's minimum radius are in phase across connecting diameters. Because two parallel flat surfaces engaged with a tri-lobular surface remain engaged regardless of the rotational position of the tri-lobular surface and without varying the distance between the surfaces, a thread can easily be rolled onto the surface with standard, flat thread dies if the surface has a convex curvature that is not too flat.

In the U.S. Pat. No. 3,249,142, Phipard says that the self-tapping screw he describes provides a high degree of back-off torque after many loosening cycles in a prevailing torque thread lock type fastener, which means that the thread lock remains good after many removals and reinstallations of the screw. The thread lock results from interference between the lobes of the screw and the walls of the female fastener cooperating with it.

Self-tapping screws, of course, permanently deform the workpiece tapped into, sometimes by cutting, sometimes by swaging. The workpieces must be soft for this to be done. Further, the conical lead of the thread has no utility other than in piloting the balance of the thread into the hole; the lead-in thread convolutions carry no load after screw setting.

While the two Phipard patents relate in particular to self-tapping screws that have threaded conical lead-in tips of substantial length, a lobular form bolt without the conical lead is described in U.S. Pat. No. 3,434,168 to Bonacci. Bonacci does not describe a true tri-lobular form.

A prevailing torque thread lock fastener with a different philosophy is shown in U.S. Pat. No. 4,381,163 to Witte. Witte shows a nut having a thin walled section with a thread pitch diameter smaller than in the base of the nut to produce a prevailing torque interference lock with a bolt. To enhance the lock, Witte plastically deforms the thin walled section with three equiangular crimps. When the nut is installed on the bolt, the crimped section tends to round out under the force of the circular bolt thread. Witte's bolt has a circular in cross-section thread.

In Witte, the bolt always acts on the nut only in the crimps and on the same nut material in the crimps. With reuse, Witte's nut wears out at the crimps because the same material always experiences stress.

U.S. Pat. No. 2,349,513 to Mortus describes a similar and well known approach. Mortus describes a nut having fingers separated by longitudinal slots; the fingers are squeezed in to reduce the diameter of the nut thread. The approach in Mortus does not use an acircular thread perimeter. The problems with the Mortus approach include a comparatively high cost of manufacture, poor tension strength of the nut in the slotted section, and a tendency of the edges of the slots to gall the male thread or its coating.

SUMMARY OF THE INVENTION

The present invention provides an improved prevailing torque type thread lock fastener system. The invention utilizes a male threaded fastener, such as a bolt, that has a tri-lobular in cross-section shank with a male thread. The tri-lobular shank has successive, axially extending lobes and sides, with the rise to the tip of the lobes and the fall to the minimum radius of the sides such that a diameter taken anywhere is always the same. A cooperating female fastener has a base and a barrel coaxial with the base. A female thread extends through both the base and barrel with the barrel thread continuing from the base thread but at a smaller pitch diameter than that of the base thread. When unstressed, the thread in both the base and the barrel is circular in cross-section and has the same pitch as that of the male fastener. The base may have a wrenching surface. The barrel wall is thin enough and its thread pitch diameter is small enough that when set the barrel flexes and elastically stretches against the lobes of the male fastener; the perimeter of the thread in the barrel has changed from circular to tri-lobular, and a prevailing torque thread lock created. This flexing and stretching of the barrel follows the lobes; it is not in the same three areas of the barrel at all times during installation. Measured when the female fastener is relaxed, the circumference of the thread root in the barrel is preferably just slightly larger than the circumference of the crest of the male thread of the shank. The female fastener is heat treated to a spring temper of at least about 40 Rockwell C, and preferably between 45 and 55 Rockwell C. The male thread is hard too, preferably at least 55 Rockwell C. Preferably, the diameter of a minor circle passing through the side of the tri-lobular shank at its minimum radius divided by the area of a circle circumscribing the lobe tips is from about 88% to about 92.5%, with the latter being especially preferred.

Preferably, a barrier washer is provided for acting between the female fastener and the work. The barrier washer has a tri-lobular hole that mates with the tri-lobular shank of the male fastener to keep it from rotating. Preferably, the washer extends into a counterbore of the female fastener, and, during setting, a projection of the washer deforms into an annular groove of the female fastener so that the female fastener and the washer couple together.

In a particular form, the present invention provides a spindle assembly for mounting a wheel that includes a spindle proper, a barrier washer, and an adjusting nut. The spindle proper has an axle for mounting the wheel either directly or through bearings. A tri-lobular shank of the spindle extends from the axle and has a constant diameter male thread along at least a portion of its length. The shank is circumferentially continuous without a key slot. The barrier washer has a mating tri-lobular in perimeter bore received by the tri-lobular shank so that the barrier washer cannot rotate with respect to the spindle. Preferably, a weak bond, say of resin, integrates the nut and washer before assembly, and the washer has wrenching surfaces; during installation, the nut separates from the washer. The nut has a threaded, right cylindrical bore that extends through a base and a barrel. The barrel has sufficient strength, the female thread diameter being sufficiently small, and a wall thin enough, so that the barrel elastically deforms from a right cylinder into a tri-lobular shape when installed on the threaded shank of the spindle. The pitch diameter of the thread in the barrel is smaller than the pitch diameter of the thread in the base so that the base thread provides several turns of the nut on the shank before the substantial resistance in the barrel section of the nut marks the beginning of the barrel section's deformation in response to the tri-lobular shank. Again, the circumference of the root of the thread in the barrel preferably just slightly exceeds the circumference of the crest of the thread on the shank, both as measured in a relaxed condition. As before, the nut is heat treated to a spring temper of at least 40 Rockwell C, preferably from 45 to 55 Rockwell C, and the diameter of the minor circle is 88% to about 92.5% of the diameter of the circumscribing circle; as before the thread of the spindle is preferably at least 55 Rockwell C.

In another practical manifestation of the invention, a steering wheel assembly has a hub with a tri-lobular hole, a shaft with a mating tri-lobular shank, and a prevailing torque lock nut that hold the assembly together. The nut has a barrel that responds to a tri-lobular threaded section of the shaft in the manner designed to produce a prevailing torque thread lock.

This invention provides a prevailing torque lock nut and bolt that work together in producing a very effective lock of the nut on the bolt. The tri-lobular bolt shank and the mating barrier washer means that problems of damage to the thread lock does not arise because no slots or flats are used.

These and other features, aspects and advantages of the present invention will become more apparent from the following description, appended claims, and drawings.

BRIEF DESCRIPTION OF THE DRAWINGS

FIG. 1 shows a presently preferred form of the prevailing torque lock fastener assembly of the present invention in work and partly in half section, the assembly being shown before setting;

FIG. 2 shows the fastener assembly of FIG. 1 in end elevation;

FIGS. 7 through 9 show the fastener assembly with the bolt being turned with respect to the nut while tightening it through 60° of rotation from FIG. 7 to FIG. 9;

FIG. 10 shows the present invention adapted into a spindle;

FIG. 11 shows the spindle of FIG. 10 in end elevation;

FIG. 12 shows the nut used with the spindle of FIG. 10 in end elevation;

FIG. 13 shows the nut of FIG. 12 in end elevation.

FIG. 14 shows the adoption of the present invention to a steering wheel shown in side elevation with spokes not being completely shown and with a portion being broken away and shown in half-section; and FIG. 15 is an end elevation of the steering wheel of FIG. 14 without the rim.

DESCRIPTION OF THE PREFERRED EMBODIMENTS

Figure 1A:
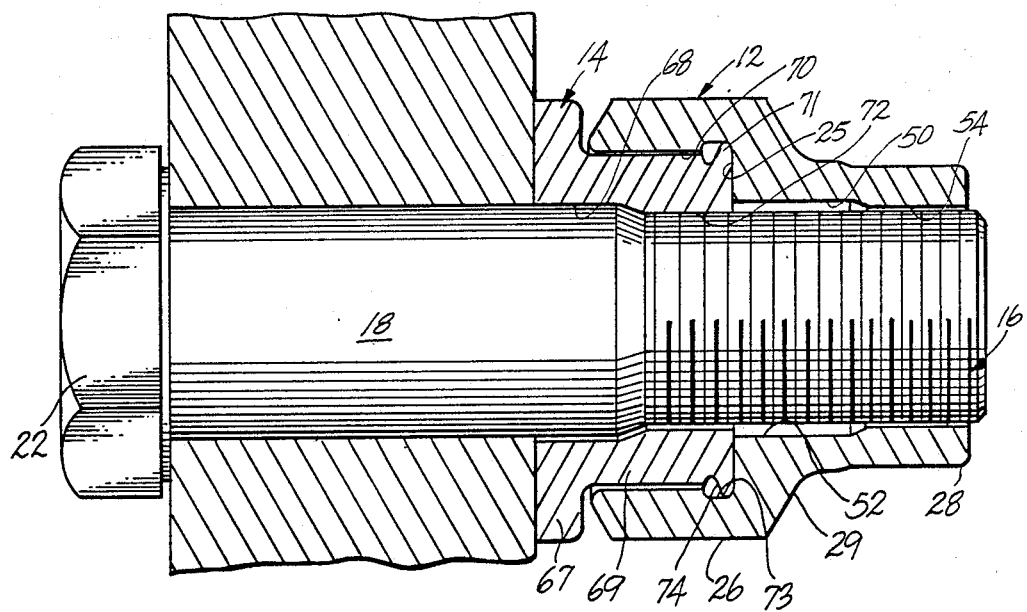
FIG. 1a shows the assembly of FIG. 1 after setting.

FIG. 1 illustrates a preferred embodiment of the fastener assembly of the present invention. In general, the fastener assembly includes a bolt 10, a nut 12, and a barrier washer 14.

The bolt has a tri-lobular in cross-section threaded shank 16. This shank merges smoothly into a right cylindrical smooth shank 18 that in turn ends at a head 20 having standard wrenching flats 22. A transition section 24 connects threaded shank 16 with smooth shank 18. In the transition section the tri-lobular form merges smoothly into a generally diverging surface of revolution; it is close to a conical section where it meets cylindrical shank 18. Shank 18 has a larger diameter than threaded shank 16. The bolt has a hardness of at least 40 Rockwell C and, preferably, from about 45 to about 55 Rockwell C.

Figure 3:
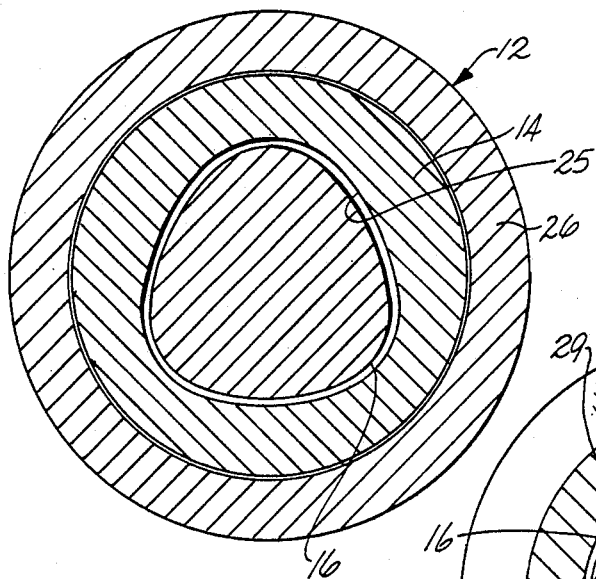
FIG. 3 shows the fastener in section in plane 3—3 of FIG. 1.

As seen in FIG. 3, washer 14 has a bore 25 with a tri-lobular perimeter. This bore mates with the tri-lobular threaded shank 16 to keep the washer from rotating with respect to the bolt. The bolt, thus, captures the washer, and the washer isolates the nut from rotation of work occurring on the cylindrical shank of the bolt.

Nut 12 has a base 26 and a barrel 28 joined by a transition section 29. The base has standard hexagonal wrenching flats 30 on its external surface. Barrel 28 has a thin wall and internal threads of a small enough diameter that it elastically flexes, stretches and deforms in response to the radial outward forces exerted on it by the lobes of tri-lobural threaded shank 16. The nut has a hardness of at least 40 Rockwell C and, preferably, from about 45 to about 55 Rockwell C. The barrel flexes and stretches as the lobes rotate within it to generally conform to the tri-lobular shape of the threaded shank. When rotation stops, the barrel walls remain in general conformity to the tri-lobular shape of shank 16. The base also has an internal thread, but this thread has a larger pitch diameter than the pitch diameter of the thread in the barrel. The base does not flex in response to the lobes because the female thread diameter there is larger than in the barrel and because the base is very thick relative to the barrel. The base cannot deform in response to the lobes because the wrenching flats of the base must keep their shape so that the wrenching tool used to tighten the fastener keeps its purchase.

The tri-lobular cross-section of theaded shank 16 is shown in FIG. 2. There, three lobes 32, 34 and 36 spaced 120° apart exert radially outward forces on barrel 28 to elastically deform it into a shape generally conforming to the shape of shank 16. When relaxed without the lobes exerting a radially outward force on it, barrel 28 is essentially circular. The tri-lobular form is characterized by having the same diametric dimension regardless of where the dimension is taken. This is shown specifically in FIG. 2: A diameter 38 taken across from the tip of lobe 36 to a point 40 opposite the lobe having the minimum radius from the axis of the bolt measures a given value. Measuring diametrically across other arbitrary points, say along a diameter 42, results in the same measured value.

As just alluded to, a side containing the point of minimum radius separates each lobe. Another way of saying this is that along any diameter the radius along the rise toward the tips of the lobes and the radius along the fall toward the minimum radius of the sides always add up to the same value. A geometric shape having this characteristic is referred to here as tri-lobular. The amount of lobe rise correlates with the area that the tri-lobular shank bears to the area of a circumscribing circle, and can be expressed as a percentage. Thus, $$E = \frac{Da}{Dm} \times 100\%, \text{ where}$$

$E$ = ratio in percent $Da$ = diameter of the circle through the low point on the side of tri-lobular shank $Dm$ = diameter of the circle passing through the tips of the lobes In terms of this relationship, the tri-lobular bolt shank of this invention preferably has an E value of between about 88% to about 92.5%. With an E lower than the lower value rolling threads onto the shank becomes too difficult. Between 88% and 92.5% the thread engagement between the thread of the barrel and the thread of the bolt depends on fastener size, hardness, and thread crest-to-root dimension. But in general, substantially complete thread engagement in the barrel is more likely to occur with a higher E, and such complete thread engagement is important for high tensile and fatigue strengths. Going higher than the 92.5% value towards a circular cross-section results in an unatisfactory loss of torque lock. Around 92.5% with standard thread types and a nut of at least 40 Rockwell C the thread engagement between bolt and nut in the nut base is good but not complete; the bolt lobe tips engage the female nut thread substantially to the crest of the female nut thread, but the bolt side minimum radius point does not engage the female nut thread. Under the same conditions and at 92.5%, the thread engagement in the barrel is substantially complete but greatest at the lobes.

The thread on tri-lobular threaded shank 16 can be a standard thread with standard pitch and thread depth. The thread is the same depth in the lobes as it is in the sides because of the constant diameter quality of the tri-lobular shape.

With specific reference again to FIG. 1, nut 12 has an axially threaded bore 50. A thread section 52 of this bore in base 30 has a pitch diameter larger than the pitch diameter of a thread section 54 of the bore in barrel 28. The pitch of the thread throughout the bore, in both sections 52 and 54, is the same. The thread diameter transcends continuously from the diameter at section 52 to that at section 54, and the thread along this transition has the same constant pitch. The root thread radius in the barrel is smaller than the radius of tri-lobular shank 16 at its thread crest at the tips of the lobes so that the barrel deforms from the lobes.

The female thread in the base of the nut pilots the nut onto the thread of the bolt. The female thread in the base of the nut also carries tensile load. In a failure test, the thread on the lobes of the bolt in the nut base failed but not the thread along the sides between the lobes, indicating not much thread engagement along the sides; in the barrel, the male thread failed all the way around the thread, both at the lobes and along the sides, indicating full thread engagement. The distribution of load over many thread convolutions reduces loading per convolution and improves fatigue life because of the reduced loading. By distributing load, tensile strength is also improved. Thus the base thread in the nut serves more than as a mere pilot thread.

Figure 4:
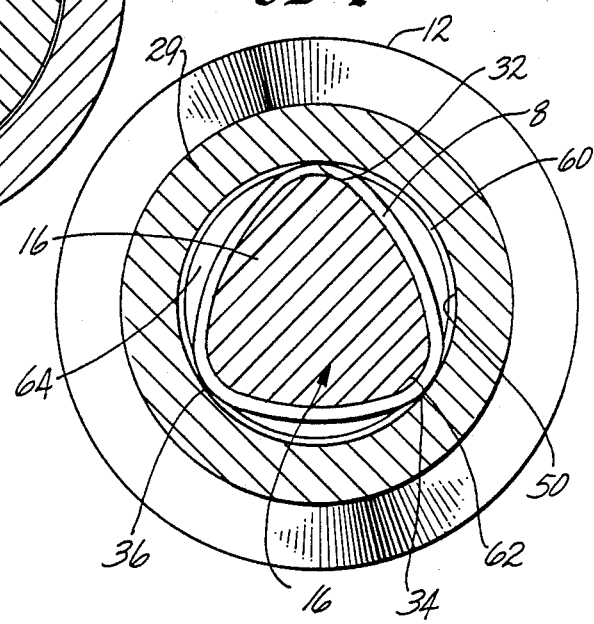
FIG. 4 shows the fastener in section in plane 4—4 of FIG. 1.

With reference to FIG. 4, bore 50 in transition section of the nut 29 is generally right cylindrical. The Figure shows a thread convolution 60 of the nut. FIG. 4 shows that in the transition section between the base and the barrel, the thread engages largely in three places. Specifically, a thread convolution 62 of the bolt engages with a thread convolution 60 of the nut, primarily at lobes 32, 34, and 36. A space 64 exists between the thread of the nut and the thread of the bolt along the sides of the tri-lobular shank. The transition section has not been noticeably deformed from the radial pressure of the lobes acting on the transition section.

Figure 5:
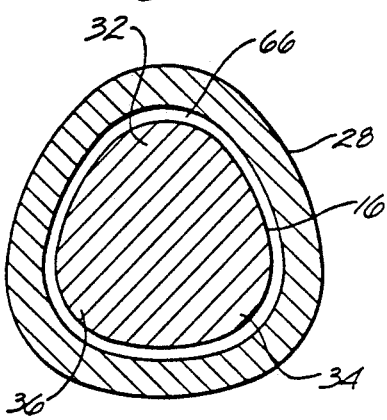
FIG. 5 shows the fastener in section in plane 5—5 of FIG. 1.

FIG. 5 shows the conformity of barrel 28 with tri-lobular threaded shank 16. Here, a thread convolution 66 of the bolt essentially completely, engages a complementary thread convolution in the nut barrel. Further, lobes 32, 34, and 36 have elastically deformed and stretched the barrel from a circular shape into a tri-lobular shape. In FIG. 5, the barrel has been elastically deformed. During nut removal from the bolt, barrel 28 flexes in response to the nut rotation, and when the nut is off, the barrel returns to a circular in cross-section form, substantially undeformed by its experience from the lobe engagement. With the nut on the bolt, the conformity of the barrel with the nut shank is not perfect and need not be perfect; spaces develop between the sides of the tri-lobular shank and the barrel bore.

FIG. 5 shows a substantial prevailing torque thread lock existing between the nut and the bolt because of the conformity of the barrel with the tri-lobular shape of shank 16.

Figure 6:
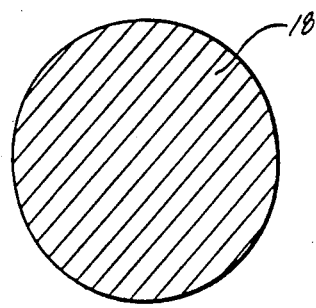
FIG. 6 shows the fastener in section in plane 6—6 of FIG. 1.

FIG. 6 shows in cross-section shank 18, and it is circular.

Returning to FIG. 1, barrier washer 14 has a base 67 for bearing on the work. It has a counterbore 68 to receive the cylindrical shank of the bolt. It also has an extension 69 extending axially from base 67 into a receiving counterbore 70 in the base of the nut. An annular projection 71 at the end of the extension has a diameter no larger than the extension itself but projects axially for engagement by a shoulder 72 of the nut at the end of counterbore 70. An annular groove 73 in the nut at the junction of counterbore 70 and shoulder 72 receives projection 71 after it deflects into the groove during the setting of the fastener assembly. The projection can be undercut at 74 to promote this radial deflection. The projection can be wedge shaped in cross-section to promote the radial deflection. The deflection is plastic. Upon the deflection of the projection into groove 73, the nut captures the washer. This capture can occur before or after final assembly of the fastener with the work. The capture permits the nut to rotate with respect to the washer. As previously brought out, bore 25 of the washer mates with the tri-lobular shank of the bolt to prevent the washer from rotating.

FIGS. 7 through 9 show the progressive deformation of the barrel section of the nut through a 60° rotation of the bolt with respect to the nut, and as viewed with the nut stationary and the bolt being tightened on it. In FIG. 7, lobe 32 is 30° from the top, and barrel 28 conforms to the tri-lobular shape of shank 16. In FIG. 8, the bolt has been rotated 30° with respect to the nut; lobe 32 now is in the vertical. The barrel continues to conform to the tri-lobular shape of the shank, and so it has conforming lobes in the vertical and at stations 120° from the vertical that have shifted 30° counterclockwise from the position shown in FIG. 7. FIG. 9 shows the progression with another 30° of counterclockwise tightening the lobes and sides of the tri-lobular shank again forcing general compliance of the barrel.

FIGS. 10 through 13 illustrate the adaption of the safety bolt of the present invention to a spindle assembly 75.

With reference to FIGS. 10 and 12, the spindle assembly generally comprises a spindle 76, a nut 78, and a barrier washer 80.

With reference to FIGS. 10 and 11, the spindle includes an axle 82 that receives bearing sets that mount a wheel for rotation. A tri-lobular in cross-section shank 84 at one end of the spindle has a thread 86 along most of its length; the shank can have a smooth, unthreaded tri-lobular in cross-section portion at its interior end adjacent the axle to receive the washer. Again, the ratio between the area of the tri-lobular shank cross-section and the area of a circumscribing circle, expressed as a percentage, is between about 88% to about 92.5%, with the latter being preferred.

As seen in FIGS. 12 and 13, nut 78 has a wrenching section 92 at its base. This section has standard wrenching flats. A barrel 94 of the nut has a thin wall so that it deforms elastically in response to the force on it of the lobes of the tri-lobular shank of the spindle. The thread of the nut is continuous and with the same pitch through the barrel and the base with the pitch diameter in the barrel being smaller than in the base. The radius to a tip of a lobe thread crest exceeds a radius to the thread root in the barrel. The lobes deform the barrel in the manner described and illustrated previously. Again, the nut has a Rockwell C hardness of at least 40, and preferably from about Rockwell C 45 to 55. The shank of the spindle also is hard, and has a hardness of at least Rockwell C 40 and preferably from about Rockwell C 45 to 55.

The washer preferably is attached to the nut as with a resin for ease of automated installation. The washer has wrenching flats 96 so that reaction tooling can be used in setting the fastener. The tri-lobular in periphery bore of the washer has a diameter about the same as the crest diameter of the threads on tri-lobular shank 84 so that it can be slipped over the thread crests of the tri-lobular shank. (The crests of the threads on the shank can be flattened slightly to fit the washer.)

To assemble the spindle assembly of FIGS. 10 through 13, an assembler places the nut and washer on the tri-lobular shaped shank. The assembler then drives the nut, and the nut separates from the washer because the spindle shank prevents the washer from rotating and as the nut rotates and advances on the thread of the shank, the washer moves ahead of it without rotation to press against the face of a bearing at the interior end of the shank. The thread in the base of the nut does not noticeably deform from the tri-lobular shank because the base thread diameter is comparatively large. Because of the reduced thread diameter in the barrel, however, elastic deformation of the barrel takes place to form a prevailing torque lock in the manner previously described.

FIGS. 14 and 15 illustrate the present invention adapted in a steering wheel assembly 100. This assembly includes a steering wheel 102 having a hub 104 and an axial hole 106. An optional washer bears against the face of the hub. A nut 110 bears against the washer, the washer distributing clamp-up load from the nut to the hub. A tri-lobular in-cross section arbor 112 mounts the hub, washer and nut. The arbor is at the end of a steering post 114. An external flange 116 of that post bears against the back of the hub and cooperates with nut 110 in mounting the steering wheel. The arbor has a tri-lobular in-cross section shank 118 that is smooth. The hub has a tri-lobular in perimeter bore 120 that mates with this shank to keep the wheel from rotating with respect to the shank. To eliminate backlash, the shank and the bore can be slightly tapered so that the shank seats tightly in the bore. The washer also has a tri-lobular in perimeter bore received on the shank.

Nut 110 has a base 122, a barrel 124 and a threaded bore 126. The base has external wrenching flats 128. Shank 118 necks down to a threaded, tri-lobular in-cross section shank 125 through a shoulder 127. As before, the pitch diameter of thread 126 is comparatively large in the base so that the base thread freely threads into shank 125 with only the lobes of the male thread fully engaging the female thread.

The pitch diameter of thread 126 in the barrel, however, is smaller than in the base. The barrel is sufficiently thin to elastically deform form lobe forces on it from tri-lobular shank 125. Because of this and the small pitch diameter of its thread, the barrel flexes, stretches and elastically deforms into general compliance with the tri-lobular shape of shank 125. This locks the steering assembly together.

The present invention has been described with reference to a preferred embodiment. The spirit and scope of the appended claims should not, however, necessarily be limited to the foregoing description.

What is claimed is:

1. An improved fastener assembly of a male fastener with a threaded shank engaged with a female fastener with a threaded axial bore comprising:
   (a) a tri-lobular shape of the shank having three equiangularly spaced lobes with a side between each lobe, the tri-lobular shape having the same diametric dimension regardless of where taken around 360°; and
   (b) the female fastener having a base and a barrel, the threaded bore extending through both the base and the barrel as a continuous thread with the thread in the barrel having a smaller pitch diameter than the thread in the base, a radius to the tip of a lobe being greater than a radius to the root of the thread in the barrel, the female thread in the barrel when unstressed being substantially circular in cross-sections taken perpendicular to the axis of the female fastener but being elastically deformed into substantial conformity with the tri-lobular shape by the thread engagement between the barrel and the shank to form a prevailing torque thread lock, the female thread in the base being in threaded engagement with the shank and in such engagement being circular in cross-sections taken perpendicular to the axis of the nut.

2. The fastener assembly claimed in claim 1 including a washer with a tri-lobular in periphery bore mating with the shank, the washer being mounted on the shank so that the shank prevents the washer from rotating with respect to the shank.

3. The fastener assembly claimed in claim 1 wherein the barrel has a hardness of at least 40 Rockwell C.

4. The fastener assembly claimed in claim 3 wherein the barrel has a hardness of from about 45 to about 55 Rockwell C.

5. The fastener assembly claimed in claim 3 including a washer with a tri-lobular in periphery bore mating with the shank, the washer being mounted on the shank so that the shank prevents the washer from rotating with respect to the shank.

6. The fastener assembly claimed in claim 5 wherein the barrel has a hardness of from about 45 to about 55 Rockwell C.

7. The fastener assembly claimed in claim 2 wherein the washer has a base for bearing on work and an extension extending axially from the base, the extension having an axially extending projection on the end of the extension remote from the base, the female fastener having a counterbore in the female fastener base for receiving the extension and a shoulder at the interior end of the counterbore for engaging the projection, and an annular groove in the female fastener base adjacent the shoulder, the projection being plastically deformable from engagement with the shoulder to displace radially and occupy the groove so that the female fastener axially captures the washer, but the washer is free to rotate with respect to the female fastener.

8. The fastener assembly claimed in claim 7 wherein the base has wrenching flats.

9. The fastener assembly claimed in claim 2 wherein the tri-lobular shank has an E between about 88% to about 92.5%, where $$E = \frac{Da}{Dm} \times 100, \text{ where}$$

$E$ = ratio in percent $Da$ = diameter of a circle through the minimum radius of the sides $Dm$ = diameter of a circle circumscribing the tips of the lobes, and the thread on the shank is roll formed.

10. The fastener assembly claimed in claim 9 wherein E is substantially about 92.5%.

11. The fastener assembly claimed in claim 9 wherein the barrel and the shank have a hardness of from about 45 to about 55 Rockwell C.

12. The fastener assembly claimed in claim 11 wherein E is substantially 92.5%.

13. The fastener assembly claimed in claim 12 wherein the circumference of the thread root in the barrel is slightly larger than the circumference of the crest of the male thread when both threads are relaxed.

14. The fastener assembly claimed in claim 10 wherein the washer has a base for bearing on work and an extension extending axially from the base, the extension having an axially extending projection on the end of the extension remote from the base, the female fastener having a counterbore in the female fastener base for receiving the extension and a shoulder at the interior end of the counterbore for engaging the projection, and an annular groove in the female fastener base adjacent the shoulder, the projection being plastically deformable from engagement with the shoulder to displace radially and occupy the groove so that the female fastener axially captures the washer, but the washer is free to rotate with respect to the female fastener.

15. The fastener assembly claimed in claim 1 including a steering post and a steering wheel, the tri-lobular shank being at the end of the steering post, the steering wheel having a hub with a tri-lobular in in perimeter hole through it complementing the tri-lobular shank, the trilobular hole receiving the shank and preventing relative rotation between the wheel and the post, the nut holding the wheel on the post.

16. The fastener assembly claimed in claim 15 wherein the tri-lobular shank has an E between about 88% to about 92.5%, where, $$E = \frac{Da}{Dm} \times 100, \text{ where}$$

$E$ = ratio in percent $Da$ = diameter of a circle through the minimum radius points of the sides $Dm$ = diameter of a circle circumscribing the tips of the lobes and the thread on the shank is roll formed.

17. In a spindle assembly having an axle for mounting a wheel, a male threaded shank, a barrier washer, and an adjusting nut, an improvement comprising:
(a) the shank having a tri-lobular shape with three lobes and a side between each lobe, the shank having the same dimension between any two diametric points on its perimeter, the shank being circumferentially continuous without any axial slots, the thread on the shank being roll formed;
(b) the nut having a base and a barrel with a threaded axial bore through both, the thread having a smaller pitch diameter in the barrel than in the base, a radius to the tip of a lobe being greater than a radius to the root of the thread in the barrel, the thread in the barrel when unstressed being substantially circular in cross-sections taken perpendicular to the axis of the nut, but being elastically deformed into substantial conformity with the tri-lobular shape by the thread engagement between the barrel and the shank to form a prevailing torque thread lock, the thread in the base being in engagement with the thread in the shank and being substantially circular in cross-sections taken perpendicular to the axis of the bore; and
(c) the barrier washer having a tri-lobular in perimeter axial bore mating with and received by the shank with the washer being captured by the shank against relative rotation.

18. The spindle assembly claimed in claim 17 wherein the washer has a wrenching section and the washer and the nut are attached together before installation on the spindle by a weak bond that fails upon the application of a predetermined torque between the washer and the nut during installation.

19. The spindle assembly claimed in claim 18 wherein the hardness of the barrel is at least 40 Rockwell C.

20. The spindle assembly claimed in claim 19 wherein the hardness of the barrel is between about 45 to about 55 Rockwell C.

21. The spindle assembly claimed in claim 19 wherein the tri-lobular shank has an E between about 88% to about 92.5%, where $$E = \frac{Da}{Dm} \times 100\% \text{ where}$$

$E$ = ratio in percent $Da$ = diameter of a circle through the minimum radius points of the sides $Dm$ = diameter of a circle circumscribing the tips of the lobes.

22. The spindle assembly claimed in claim 21 wherein E is substantially 92.5%.

* * * * *